United States Patent [19] [11] Patent Number: 4,491,154
Peters [45] Date of Patent: Jan. 1, 1985

[54] DOUBLE ACTING PILOT VALVE

[75] Inventor: Clifford M. Peters, Longview, Tex.

[73] Assignee: Joy Manufacturing Company, Pittsburgh, Pa.

[21] Appl. No.: 492,539

[22] Filed: May 9, 1983

[51] Int. Cl.³ ............................................. F15B 13/042
[52] U.S. Cl. ........................... 137/625.66; 137/625.26; 137/625.68
[58] Field of Search ...................... 137/625.26, 625.66, 137/625.68

[56] References Cited

U.S. PATENT DOCUMENTS

| | | | |
|---|---|---|---|
| 3,706,322 | 12/1972 | Carlson | 137/625.66 |
| 3,744,523 | 7/1973 | Hill | 137/625.68 |
| 4,187,884 | 2/1980 | Loveless | 137/625.66 X |
| 4,209,040 | 6/1980 | Peters | 137/625.68 X |

Primary Examiner—Gerald A. Michalsky
Attorney, Agent, or Firm—Marvin J. Marnock

[57] ABSTRACT

A pilot valve adapted for connection between a double acting fluid actuator (12) of the piston-type and a hydraulic fluid supply (21). The pilot valve comprises an elongate body (30) with an axial bore (32, 33) therethrough and a piston chamber (38) at one end of the valve body. A valve plunger (49) affixed to the piston (50) in the piston chamber (38) is mounted in the axial bore for movement between first and second operating positions in response to the selective application of pneumatic pressure to the piston (50). The valve (20) is provided with valve ports (56, 60) for accommodating connections with a hydraulic fluid reservoir (21), and a piston-type actuator (12), respectively, whereby in the first operative position of the valve plunger (49), the valve (20) is conditioned for the transmission of hydraulic fluid to a first side of the actuator piston (17) and the removal to the sump (22) of hydraulic fluid from the other second side of the actuator piston (17) through valve ports (81, 75). In the second operative of the valve plunger (49), the valve is conditioned for the transmission of hydraulic fluid to the second side of the actuator piston (17) through the valve ports (83, 81) and the removal of hydraulic fluid from the first side of the actuator piston (17) to the sump through valve ports (81, 75). In the first operative position, internal passage means (57, 58, 59) in the plunger establish communication between the reservoir (21) and the first side of the actuator piston for transmission of fluid thereto and second internal passage means (77, 78, 79) establish communication between the second side of the actuator and the sump.

1 Claim, 3 Drawing Figures

DOUBLE ACTING PILOT VALVE

BACKGROUND OF THE INVENTION

The invention relates to a control valve mechanism for controlling the flow of hydraulic fluid to and from a hydraulic fluid actuator in a pressurized hydraulic fluid control system. More particularly, it is concerned with valves of the type which are responsive to a pilot pressure for controlling flow of hydraulic fluid to an actuator in a safety system for oil or gas wells.

Pilot valve mechanisms are typically used for responding to pressure variations in a flow system and inducing the actuation of a mechanical device such as a valve actuator, fluid motor or the like. In well safety systems, the mechanisms are usually designed for automatic response to shut down operation of a flow system such as the production line of an oil or gas well whenever pressures in the flowline are outside a predetermined acceptable range. The pilot valves usually include a shuttle valve mechanism which either communicates or interrupts fluid communication of the actuating fluid to the fluid actuator depending on the position of the shuttle valve element with respect to the inlet and outlet of the pilot valve and as induced by the pilot pressure. The mechanisms may also include a bleed port for bleeding the actuating fluid from the fluid actuator to accomplish its deactivation. In many fluid control safety systems where there are long fluid supply lines, quick bleed exhaust valves or "dump" valves have been provided to effect a relatively fast exhaust of fluid from the fluid actuator. U.S. Pat. No. 4,209,040, shows a "dump" valve incorporated in a safety control system for a well having a downwhole safety valve and U.S. Pat. No. 4,041,970 shows a quick bleed exhaust valve for connection between a fluid actuator and a pressurized fluid supply for the quick bleeding of actuating fluid from the actuator. Both of these patents describe a valve for controlling the supply of actuating fluid to a single-acting actuator and the bleeding of actuating fluid when the supply is interrupted. In their "dump" function, these valves must rely on an actuator spring for forcing the ejection of actuating fluid from the control system and if remotely located from the actuator, a relatively long period of time is required. Accordingly, an object of this invention is to provide a unique double acting pilot valve which can be used for effecting the rapid distribution of an actuating fluid to and from a double acting actuator.

SUMMARY OF THE INVENTION

The double acting pilot valve of this invention includes an elongate valve body with a piston actuated plunger element mounted therein which is responsive to a selectively controlled application of pneumatic fluid pressure to be placed in either one of two operative positions. The valve is provided with a plurality of ports for accommodating pairs of connections with a hydraulic fluid reservoir, a sump, and a piston-type actuator, respectively, whereby in the first operative position of the valve plunger, the valve is conditioned for the transmission of hydraulic fluid to a first side of the acutator piston and the removal to a sump of hydraulic fluid from the other second side of the actuator piston. In the second operative position of the valve plunger, the valve is conditioned for the transmission of hydraulic fluid to the second side of the actuator piston and the removal of hydraulic fluid from the first side of the actuator piston to the sump.

Figure 1:
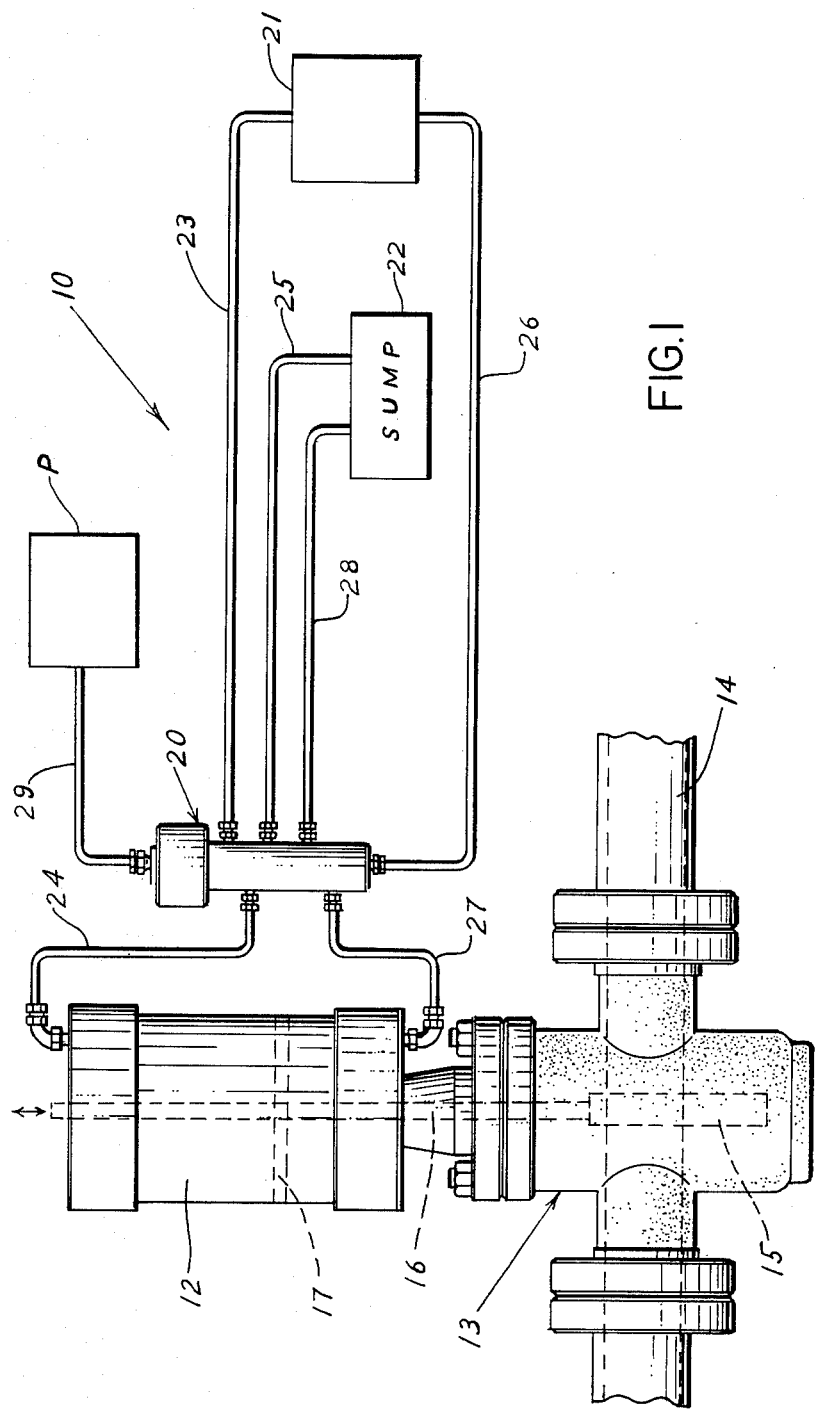
FIG. 1 is a schematic of a typical system utilizing the pilot valve of this invention wherein the pilot valve is installed to control the distribution of hydraulic fluid to and from either side of a piston in an actuator for controlling the operation of a gate valve in a flowline.

Referring more particularly to the drawings, there is shown in FIG. 1, a representative fluid control system 10 which utilizes the double acting pilot valve of the invention. This system and its operation described herein are provided to facilitate an explanation and understanding of the pilot valve of the invention. The system 10 is operable to selectively apply an actuating fluid to a hydraulic actuator 12 for controlling a device such as a main gate valve 13 in a flowline 14 in the production line of an oil or gas well. The gate valve 13 has a gate element 15 which is movable between open and closed positions relative to the flowline 14. Typically, the gate element 15 is provided with a port therethrough which is disposed in registry with the flowline 14 in the open condition of the valve 13. The gate 15 is also connected to a stem 16 which extends through the top of the valve 13 into the hydraulic actuator 12. The actuator 12 includes a cylinder and piston assembly with a piston 17 mounted in the cylinder for reciprocating movement within the cylinder and secured to the stem 16 which moves in correspondence therewith. Accordingly, the gate valve 13 opens the flowline 14 when the piston 17 and gate element 15 are in the lowered position as shown in FIG. 1 and correspondingly closes the flowline 14 when the piston 17 and the gate element are in the raised position. Although not required, a coil spring (not shown) may be disposed in the hydraulic actuator 12 in coaxial relation about the stem 16 and in abutting relation to the bottom of the actuator 12 and the underside of the piston 17 so as to urge the piston 17 and the gate element 15 to the raised closed position with respect to the flowline 14.

The double acting pilot valve 20 is shown as it is incorporated in the system 10 for controlling the flow of hydraulic actuating fluid to and from the actuator 12. The pilot valve 20 is operable to control the supply of actuating fluid from a hydraulic fluid reservoir 21 to the actuator 12 to either side of the actuator piston 17 to selectively open or close the flowline valve 13 in a positive manner. It is also operable, as will hereinafter be described in greater detail to permit the quick bleeding of actuator fluid to a sump 22 thereby accomplishing a more rapid operation of the flowline vale 13 than is customarily attained in systems of this type. The rapid operation of the flowline valve 13 assumes considerable importance in many applications, as when the fluid control system 10 is part of a safety control system.

Figure 2:
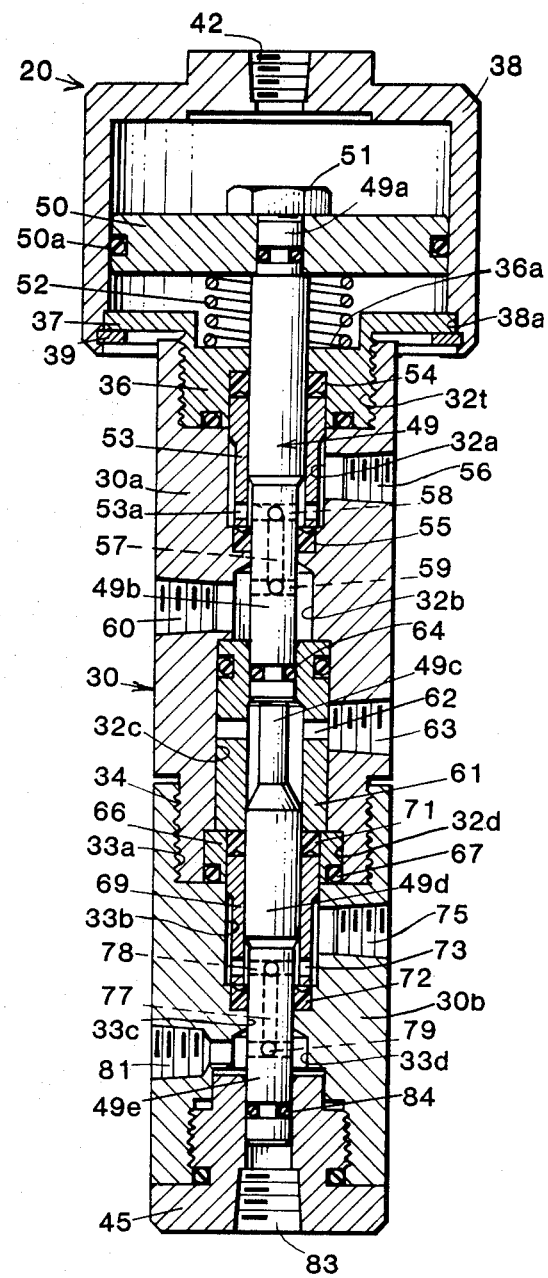
FIG. 2 is a longitudinal cross-section of an embodiment of the pilot valve of this invention with the valve plunger element thereof shown in a first operative position as controlled by the application of pressurized pneumatic fluid to a piston attached to one end of the plunger element.
Figure 3:
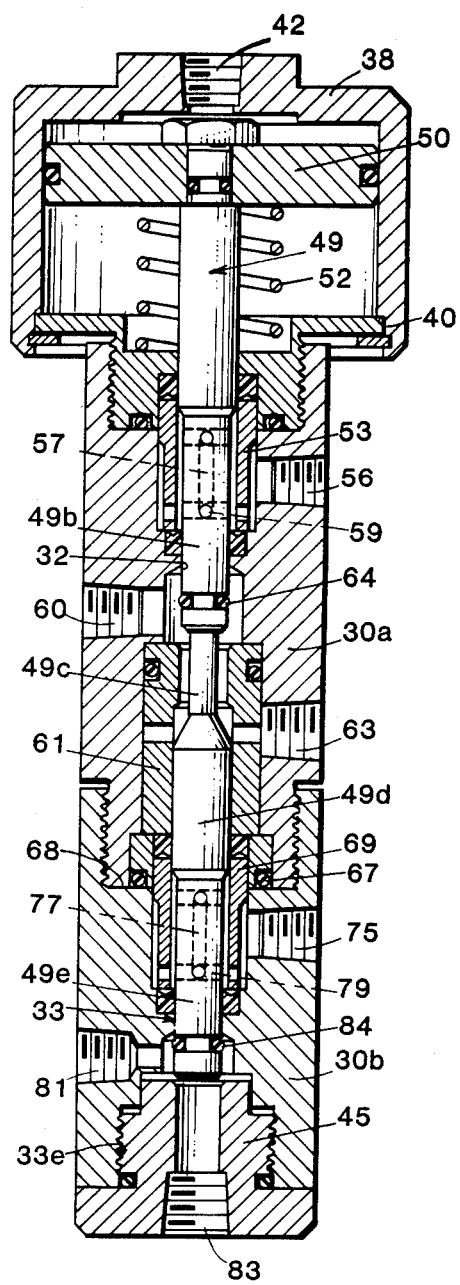
FIG. 3 is a cross-sectional view similar to that of FIG. 2 wherein the valve plunger element is shown in a second operative position determined by the removal of pressurized pneumatic fluid from the piston end of the plunger element.

In FIG. 2 the pilot valve 20 is shown in longitudinal cross-section in a first operative condition of transmitting hydraulic fluid from the hydraulic fluid reservoir 21 to the top of the actuator 12. In FIG. 3, it is shown in the second operative condition of transmitting hydraulic fluid from the reservoir 21 to the bottom of the actuator 12. The pilot valve 20 is connected with the reservoir 21 to receive hydraulic fluid therefrom by means of a conduit 23. It is also connected to the top side of the actuator 12 by a conduit 24 for the purposes of communicating hydraulic fluid to the actuator 12 and also to return hydraulic fluid from the actuator 12 to the sump 22 via a conduit 25 which connects the pilot valve 20 with the sump 22.

The pilot valve 20 is also connected to the hydraulic reservoir 21 by a second conduit 26 which is coupled to the bottom end of the pilot valve 20 whereby the pilot valve 20 is adapted to receive hydraulic fluid from the reservoir 21. A conduit 27 connects the bottom side of the actuator 12 with the pilot valve 20 and a conduit 28 is also connected to the valve 20 in a manner to be adapted to return hydraulic fluid from the bottom side of the actuator to the sump 22, depending on the operating condition of the valve 20.

As will be seen in FIGS. 2 and 3, the pilot valve 20 includes an elongate generally cylindrical body portion 30 of circular transverse cross-section which is comprised of two cylindrical body portions 30a, 30b which are coupled in coaxial alignment by means of a threaded connection 34. The body portion 30a is provided with an axial bore 32 therethrough which is in communication and axial alignment with an axial bore 33 through the body portion 30b. The aligned axial bores 32 and 33 are formed with portions of various diameters for purposes hereinafter described. At its upper end the axial bore 32 includes an enlarged diameter portion 32t which is formed with internal threads for receiving the lower threaded end of a bonnet 36 which is connected thereto. The bonnet 36 is provided with a radial flange 37 at its upper end and an axial bore therethrough which when the bonnet is connected to the body 30 is disposed in coaxial alignment therewith.

A generally cylindrical piston chamber housing 38 is affixed to the top end of the bonnet 36 by means of a retainer ring 39. The piston housing 38 is formed at its lower end with an internal diameter bore 38a corresponding to but slightly larger than that of the bonnet flange 37 so that the piston housing can be sleeved thereover. The wall defining bore 38a is also formed with an annular groove adjacent the open end of the piston housing for accommodating the retainer ring 39, the top annular surface of which abuts the underside of the bonnet flange 37 in a supporting relation thereto with the flange being clamped between the retainer ring 39 and the downward facing wall 40 of the retainer ring accommodating groove. The piston housing 38 is provided in its upper end with a threaded opening or port 42 for accommodating the coupling thereto of a conduit 29 which communicates the piston chamber with a selectively operable or interruptible pneumatic pressure source P as is shown in FIG. 1.

The lower end of the cylindrical body portion 30b is internally threaded in an enlargement of its axial bore for accommodating a fitting 45 which is threaded therein. The axial bore 33 through the fitting 45 is aligned with the axial bore through the valve body 30 and provided with internal threads in its outer end portion for coupling to the conduit 26 as shown in FIG. 1.

The pilot valve 20 is provided with an elongate valve plunger 49 which is slidably disposed in the axial bore of cylindrical body 30 and attached at its upper end to a piston 50 which works in the piston chamber housing 38. A reduced diameter end portion 49a of the plunger 49 extends through a central opening in the piston 50 and is fitted at its end with a nut 51 which is threaded onto the end of the plunger to secure the piston thereto. An O-ring 50a fitted in a groove about the plunger extension seals between the piston and plunger. A coil spring 52 disposed coaxially about the plunger 49 engages the underside of piston 50 and an annular surface 36a formed in the top of the bonnet 36 for biasing the piston towards an upper position as shown in FIG. 3.

The axial bore 32 of the cylindrical body 30 includes an enlarged diameter bore section 32a which is an extension of a corresponding bore provided in the underside of bonnet 36. A spacer member 53 and upper and lower annular packings 54, 55 are disposed within the enlarged bore section 32a in sleeved relation to the plunger 49 with the spacer 53 intermediate the upper annular packing 54 and the lower annular packing 55.

The plunger 49 includes a reduced diameter section 49b in a portion thereof which is located within the spacer sleeve 53 and thereby forms a first annular chamber as defined by the internal wall of the spacer sleeve 53 and the external wall of the reduced diameter section 49a of the plunger 49. The spacer sleeve 53 is also provided with a reduced external diameter section in substantially the lower half thereof which forms a second annular chamber as defined by the external wall of the reduced portion of the spacer 53 and the cylindrical wall of the body bore section 32a. Fluid communication is established between these two chambers by means of one or more radial ports 53a through the wall of the lower end of the spacer 53. Formed through the wall of the valve body portion 30a radially adjacent the spacer 53 is a threaded port 56 for accommodating connection with the conduit 23 as shown in FIG. 1 such that hydraulic fluid from the reservoir 21 is communicated to the body bore section 32a and the two annular chambers which are formed therein external and internal of the spacer sleeve 53.

An internal axially located passage 57 is formed in the plunger 49 in the reduced diameter section 49b thereof and is connected at its upper end with a radial cross port 58 and at its lower end with a radial cross port 59.

The upper radial port 58 is always in communication with the hydraulic fluid inlet port 56 by means of the two annular chambers internal and external of the spacer 53 for either position of the piston and plunger as illustrated in FIGS. 2 and 3. The hydraulic fluid supplied through the inlet port 56 is adapted to be transmitted through the pilot valve 20 to the actuator 12 by means of a threaded port 60 to which the conduit 24 connects. However, fluid communication between the inlet port 56 and the port 60 cannot occur when the plunger 49 and piston 50 are in the upper position as shown in FIG. 3. Communication for transmission to the actuator 12 can only occur when the piston 50 is moved to compress the piston biasing spring 52 to a position as shown in FIG. 2 wherein the lower cross port 59 is disposed adjacent to and in fluid communication with the port 60.

The axial bore 32 through the body portion 30a is enlarged at 32b adjacent the port 60 and includes successive counterbore enlargements 32c, 32d towards the lower end of body portion 30a. A sleeve member 61 is disposed within the bore enlargement 32c in sleeved relation to the plunger 49. The sleeve member 61 is provided with a lateral port 62 intermediate its ends which communicates with a threaded outlet port 63 through the wall of the valve body portion 30a. The threaded outlet port 63 accommodates the connection therewith of the conduit 25 which communicates with the sump 22.

A further reduced diameter portion 49c of plunger 49 directly below the reduced diameter plunger section 49b provides an annular chamber which is defined by the external surface of the plunger section 49c and the inner wall of an enlarged diameter bore section of the sleeve member 61. This annular chamber communicates with the outlet port 63 via the lateral sleeve port 62 but is blocked by an O-ring seal 64 from communication with the port 60 when the plunger is in the position shown in FIG. 2. The O-ring 64 is received in an external groove in the plunger section 49b adjacent the lower end thereof and just above the further reduced plunger section 49c. The O-ring 64 establishes a seal between the plunger section 49b and the sleeve member 61 as shown in FIG. 2 but is moved out of sealing engagement with the sleeve member 61 when the piston 50 and plunger 49 are in the position shown in FIG. 3. In such position, fluid communication is established between the valve ports 60 and 63 as the larger plunger section 49b is moved out of the sleeve memeber 61.

Located in the bore section 32d immediately below the sleeve 61 and in support thereof is an adapter ring 66. The external surface of the adapter 66 is grooved about its periphery to provide an annular corner notch which accommodates an O-ring 67. The O-ring 67 engages the annular shoulder 68 provided by the enlarged threaded section 33a of the axial bore 33 through the valve body portion 30b. The O-ring 67 establishes a fluid-tight seal between the adapter 66 and the valve body portion 30a and also between the adapter 66 and the valve body portion 30b.

The axial bore 33 through the body portion 30b includes a reduced diameter section 33b immediately below the threaded bore section 33a which is of a diameter corresponding to the internal diameter of the adapter 66. A spacer sleeve 69 and upper and lower annular packings 71, 72 are disposed within the bore section 33b and the bore of the adapter 66 in sleeved relation to an enlarged diameter section 49d of the plunger 49 and directly below plunger section 49c with the spacer sleeve disposed intermediate the packings 71, 72 in abutting relation thereto. The plunger 49 includes a reduced diameter section 49e which is formed just below the enlarged plunger section 49d and located through a portion of its axial extent within the spacer sleeve 69.

The external surface of the plunger section 49e and the bore wall of spacer sleeve 69 define an inner annular chamber therebetween. The spacer sleeve 69 is also provided with a reduced external diameter section in substantially the lower half thereof which with the bore wall of the body bore section 33b forms an outer annular chamber which communicates with the inner annular chamber by a lateral port 73 through the wall of the spacer sleeve 69. Formed through the wall of the valve body portion 30b adjacent the spacer sleeve 69 in a radial direction therefrom is a threaded port 75 for accommodating connection with the conduit 28 as shown in FIG. 1.

An internal axially located passage 77 is formed within the plunger section 49e and is connected at its upper end with a radial cross port 78 and its lower end with a radial cross port 79 as shown in FIG. 2. The upper cross port 78 is always in communication with the inner and outer annular chambers about the spacer sleeve 69 and thereby is always in communication with the valve port 75 for either position of the plunger as illustrated in FIGS. 2 and 3.

The valve body portion 30b is provided with another valve port 81 which extends radially through the wall thereof to communicate with an enlargement 33d of the axial bore 33 of the valve 20. The axial bore enlargement 33d is formed just below a reduced diameter bore section 33c which is intermediate the bore sections 33b and 33d. The valve port 81 is internally threaded in its outer end portion for accommodating connection with the conduit 27 which leads to the bottom of the actuator 12. In the position of the plunger 49 as shown in FIG. 1, the cross port 79 is disposed adjacent the valve port 81 such that there is fluid communication between the valve ports 81 and 75. However, fluid communication between the valve ports 81 and 75 is blocked when the piston 50 and plunger 49 are in the raised position as shown in FIG. 3 wherein the cross port 79 is moved out of communication with the valve port 81.

The end of the pilot valve 20 remote from the piston end is equipped with the fitting 45 which is threadedly connected to the body portion 30b in an enlargement 33e of the axial bore of the body portion 30b. The axial bore through the fitting 45 is disposed in coaxial alignment with the plunger 49 and the axial bore through the valve 20. In its outer end portion, the bore through the fitting 45 is internally threaded to provide an inlet port 83 with internal threads for accommodating connection therewith of the conduit 26 which communicates with the hydraulic reservoir 21. The lower end of the plunger 49 is adapted to be received in the axial bore of the fitting 45 as shown in FIG. 2. An O-ring 84 which is received in a circumferential groove about the plunger section 49e adjacent the end of the plunger establishes a seal between the plunger and the fitting 45 and blocks communication between the valve ports 83 and 81. In the raised position of the piston and plunger as illustrated in FIG. 3, the plunger and O-ring 84 are moved out of the bore of fitting 45 and communication is established between the valve ports 83 and 81.

In the system 10 the pilot valve 20 is adapted to be operated in response to the selective application of pressurized pneumatic fluid to the piston chamber housing 38. The pneumatic fluid source must, of course, be interruptible as by the provision of a three-way valve (not shown) in the supply conduit 29. By operation of such a valve the piston may be driven to place the valve in its first operative condition as illustrated in FIG. 2. For this condition of the valve 20, hydraulic fluid is transmitted from the reservoir 21 through the valve inlet port 56, internal passage 57, and valve port 60 to the actuator 12 and the top side of the actuator piston 17. At the same time, fluid in the actuator 12 which is below the actuator piston 17 is driven from the actuator housing by the movement of the piston which opens the gate valve 13. This fluid is removed from the actuator through the conduit 27, valve port 81, internal passage 77, valve port 75, and conduit 28 to the sump 22. This removal of hydraulic fluid or "dump" function is accomplished in a very positive manner by application of a constant force during a very controlled short time period without reliance on relatively slower spring action and an uneven spring force.

Upon the cessation of the application of pneumatic pressure to the valve piston 50, as by placing the three-way valve in a vent condition, the piston 50 and plunger 49 are driven by the valve piston spring 52 to place the valve 20 in its second operative condition as illustrated in FIG. 3. For this condition of the valve 20, hydraulic fluid is transmitted from the reservoir 21 through conduit 26, valve ports 83 and 81, and conduit 27 to the actuator 12 for application to the underside of the actuator piston 17 which results in lifting of the gate element 15 in the gate valve 13 and the closing of the gate valve. At the same time, hydraulic fluid atop the piston 17 is removed from the actuator housing through the conduit 24, valve ports 60 and 63, and conduit 25 to the sump 22.

While the supply of pneumatic fluid to the pilot valve 20 has been described as controlled by operation of a three-way valve in the conduit 29, it could, of course, be controlled by a pilot valve mechanism for automatically controlling the flow of the pneumatic medium in response to predetermined variations in a pressurized system such as described in U.S. Pat. No. 4,137,942 and U.S. Pat. No. 3,996,965. However, other automatic control mechanisms could serve as well.

It is to be understood that the foregoing description of a preferred embodiment of the invention has been presented for purposes of illustration and description and is not intended to limit the invention to the precise form disclosed. While illustrated with a control system for controlling a flowline valve, the invention is applicable to any fluid control system which utilizes a double acting actuator. It is preferred for fast action that the system for actuator function be hydraulic. While this description uses the term "vent port" it is intended to be synonymous with the term "bleed port". It is to be appreciated, therefore, that changes may be made by those skilled in the art to suit particular applications without departing from the spirit of the invention.

What is claimed is:

1. A pilot valve adapted for connection between a hydraulic fluid supply and a double acting fluid actuator of the hydraulic piston type, said pilot valve comprising:
   a generally cylindrical valve body having an axial bore extending therethrough and a piston chamber housing affixed to one end of said valve body in fluid communication with the axial bore;
   a valve plunger element slidably mounted in said axial bore for movement between first and second operating positions;
   a piston disposed in said piston chamber housing and affixed to one end of the valve plunger element;
   spring means for urging the piston and valve plunger element in a direction outwardly of said axial bore, said piston chamber housing being provided with a fluid inlet port means whereby pressurized pneumatic fluid delivered to the piston chamber through the fluid inlet port means will urge the piston and attached valve plunger element against the biasing force of said spring means to said first operating position, said valve plunger element being moved by the spring means to said second operating position when pressurized pneumatic fluid is removed from the piston chamber;
   a first inlet port formed in said valve body and adapted for connection to a hydraulic fluid supply for receiving hydraulic fluid;
   a first outlet port adapted for connection to a conduit for delivering hydraulic fluid to a first side of the piston in the actuator, said valve plunger element being provided with first internal passage means which in the first operating position of the valve plunger element establishes fluid communication between said first inlet port and said first outlet port for the transmission of hydraulic fluid therethrough;
   first seal means located in said axial bore at a location intermediate the first inlet port and the first outlet port for sealing off communication therebetween when the valve plunger element is disposed in the second operating position;
   a first bleed port formed in said valve body and adaptable for connection to a conduit communicating with a sump;
   second seal means carried on said valve plunger element and positionable between the first outlet port and the first bleed port when the valve plunger element is in its first operating position for sealing off communication therebetween, said second seal means being carried by said valve plunger element to a position where it is inoperative when the valve plunger element is moved to said second operating position;
   a second inlet port formed in said valve body and adapted for connection with the hydraulic fluid supply;
   a second oulet port formed in said valve body adapted for connection to a conduit for delivering hydraulic fluid to the second side of the piston in said actuator;
   third seal means provided on the valve plunger element and positionable between the second inlet port and said second oulet port for sealing off communication therebetween when the valve plunger element is in its first operating position;
   a second bleed port formed in said valve body adapted for connection to a conduit communicating with the hydraulic sump, said valve plunger element being provided with second internal passage means which in the first operating position of the valve plunger element establishes fluid communication between the second outlet port and the second bleed port; and
   fourth seal means located in said axial bore between said second outlet port and the second bleed port for sealing off communication therebetween when the valve plunger element is in the second operative position.

* * * * *

UNITED STATES PATENT AND TRADEMARK OFFICE
CERTIFICATE OF CORRECTION

PATENT NO. : 4,491,154

DATED : January 1, 1985

INVENTOR(S) : Clifford M. Peters

It is certified that error appears in the above-identified patent and that said Letters Patent is hereby corrected as shown below:

Column 1, line 35, change "downwhole" to -- downhole --.

Column 1, line 63, change "actutator" to -- actuator --.

Column 2, line 64, change "vale" to -- valve --.

Column 5, line 28, change "memeber" to -- member --.

Column 8, line 44, change "oulet" to -- outlet --.

Signed and Sealed this

Twenty-second Day of October 1985

[SEAL]

Attest:

DONALD J. QUIGG

Attesting Officer

Commissioner of Patents and
Trademarks—Designate